(12) United States Patent
Wuidart et al.

(10) Patent No.: US 7,222,237 B2
(45) Date of Patent: May 22, 2007

(54) SECURE MULTIMEDIA DATA TRANSMISSION METHOD

(75) Inventors: Luc Wuidart, Pourrieres (FR); Pierre Balthazar, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 739 days.

(21) Appl. No.: 10/238,839

(22) Filed: Sep. 10, 2002

(65) Prior Publication Data

US 2003/0065924 A1 Apr. 3, 2003

(30) Foreign Application Priority Data

Sep. 10, 2001 (FR) .................................. 01 11676

(51) Int. Cl.
*H04L 9/00* (2006.01)
*H04K 1/00* (2006.01)
*G06F 7/58* (2006.01)

(52) U.S. Cl. ........................ 713/176; 713/179
(58) Field of Classification Search .................. None
See application file for complete search history.

(56) References Cited

U.S. PATENT DOCUMENTS

| 5,544,245 | A | | 8/1996 | Tsubakiyama | |
|---|---|---|---|---|---|
| 5,907,619 | A | | 5/1999 | Davis | |
| 5,920,630 | A | * | 7/1999 | Wertheimer et al. | 380/286 |
| 6,009,177 | A | * | 12/1999 | Sudia | 713/191 |
| 6,282,650 | B1 | * | 8/2001 | Davis | 713/176 |
| 6,398,245 | B1 | * | 6/2002 | Gruse et al. | 280/228 |
| 6,425,081 | B1 | * | 7/2002 | Iwamura | 713/176 |
| 6,769,060 | B1 | * | 7/2004 | Dent et al. | 713/168 |
| 6,801,999 | B1 | * | 10/2004 | Venkatesan et al. | 713/167 |
| 6,823,455 | B1 | * | 11/2004 | Macy et al. | 713/176 |
| 6,952,768 | B2 | * | 10/2005 | Wray | 713/152 |
| 2001/0021256 | A1 | | 9/2001 | Menezes et al. | |
| 2002/0141582 | A1 | * | 10/2002 | Kocher et al. | 380/201 |
| 2004/0062400 | A1 | * | 4/2004 | Sovio et al. | 380/286 |
| 2004/0133794 | A1 | * | 7/2004 | Kocher et al. | 713/193 |
| 2005/0039022 | A1 | * | 2/2005 | Venkatesan et al. | 713/176 |

FOREIGN PATENT DOCUMENTS

WO    WO 01/56222 A    8/2001

OTHER PUBLICATIONS

European Search Report from corresponding European Patent Application No. 02354138.
French Search Report from French Patent Application No. 01/11676, filed Sep. 10, 2001.

* cited by examiner

*Primary Examiner*—Gilberto Barron, Jr.
*Assistant Examiner*—Virgil Herring
(74) *Attorney, Agent, or Firm*—Lisa K. Jorgenson; William R. McClellan; Wolf, Greenfield & Sacks, P.C.

(57) ABSTRACT

A secure method and system of digital data transmission between a sender and a receiver, including a phase of receiver authentication by a symmetrical authentication key sharing algorithm with no transmission of the key, a phase of data watermarking by using the authentication key as the watermarking key, and a phase of transmission of the watermarked data.

7 Claims, 2 Drawing Sheets

SECURE MULTIMEDIA DATA TRANSMISSION METHOD

BACKGROUND OF THE INVENTION

1. Field of the Invention

The present invention relates to the transmission of multimedia data, for example, animated or still images, or audio sequences in digital form. The present invention more specifically relates to the transmission of data files made secure by insertion of binary identification or authentication codes or messages. The technique of insertion of binary codes into digital images or, more generally, into data files, is known as watermarking and has had a recent expansion with the rapid development of digital image transmission, especially over the Internet. This technique not only enables protecting digital multimedia contents against possible illicit copies but also preserving these multimedia contents against possible attempts of falsification during a transmission (image tricking or the like).

2. Discussion of the Related Art

An example of application of the present invention is the transmission of digitized images (digital photographs or digitized video sequences) between an image shooting element (for example, a journalist's photographic camera or video camera) and a distant system (for example, a press agency or the studios of a television broadcasting channel).

In this type of application, a double (bidirectional) security is needed. First, the distant shooting element must be sure of the receiver's identity before starting the transmission. Then, the receiver elements must be sure of the origin of the digital images that it receives before broadcasting them. It must also be able to make sure that they have not been modified (tricked) since their transmission.

In practice, the digital shooting device (video or photographic camera) is generally connected to a computer equipped with a modem to transmit the image and/or sound files through a public transmission network (telephone, or the Internet). The receiver is also provided with a modem to receive the data files and with applicative means necessary to their exploitation.

Conventionally, the sender inserts a binary code or message in the images before transmitting them. A so-called watermarking algorithm is used to code or position in the images the messages to be inserted therein. This watermarking is generally performed in a way imperceptible to human eye. A read or extraction algorithm is used on the receive side to restore the messages formed, according to the application, of identification, authentication codes, or the shooting characteristics, etc.

In the case of animated sequences, all the images or part of them then include an insertion (for example, an author identification code is reproduced in all images or in part of them). In this example, it is besides possible for the content of the respective codes to be linked to the sequence to detect a possible image insertion or suppression.

Generally, watermarking algorithms modify either certain pixels in the image, or certain coefficients in an image transform (Fourier transform, discrete cosine transform, etc.). The pixels or coefficients to be modified are generally selected by using a watermarking key specific to the user (the coder). The modifications are, for example, an inversion of coefficient pairs so that their value respects a relation depending on the value of the bit to be hidden, or a mere addition of the message to be hidden previously modulated by a Gaussian white noise. In certain cases, the watermarking visibly modifies the original image.

Without the watermarking key, the receiver element cannot recover the message. Further, if the image is visibly modified by the watermarking, it then cannot even recover the original image. Further, if it has the key, it can detect that the image that it receives has a strong risk of having been falsified if it does not recover the expected message.

A disadvantage of conventional transmission methods is that the sender is not able to make sure, before transmission, that it really is in communication with a given receiver. Indeed, a pirate receiver may pretend to be the receiver of the images or intercept a transmission which is not intended for it.

U.S. Pat. No. 5,544,245 discloses an example of a system providing a mutual authentication key based on a symmetrical cyphering. The purpose of this document is to obtain a common key on the transmitter and receiver sides. This document only aims at providing an authentication or cypher key and not at marking data to be transmitted from a transmitter to a receiver.

SUMMARY OF THE INVENTION

The present invention aims at providing a secure method of multimedia digital data transmission which overcomes the problems of conventional solutions. The present invention in particular aims at making sure of the origin of the data.

More generally, the present invention aims at providing such a method which applies to any digital data file capable of being coded by insertion of messages by means of a watermarking algorithm. The present invention more specifically applies to symmetrical watermarking algorithms, that is, in which the watermarking key is identical to the read, decode, or extract key.

The present invention also aims at providing a method which reduces or minimizes the number of code or data exchanges taking part in the mutual authentication between the sender and the receiver.

The present invention also aims at not requiring hardware modifications of digital files and at being implementable with conventional algorithms and software means.

To achieve these and other objects, the present invention provides a secure method of digital data transmission between a sender and a receiver, including the following phases:

a phase of receiver authentication by a symmetrical authentication key sharing algorithm with no transmission of the key;

a phase of data watermarking by using the authentication key as the watermarking key; and a phase of transmission of the watermarked data.

According to an embodiment of the present invention, the watermarking phase includes inserting a message in the data.

According to an embodiment of the present invention, the watermarking phase includes the steps of:

drawing, by the receiver, of a random number and transmission of this number to the sender; and watermarking of the data by the sender by using said random number as a message to be inserted and the authentication key as the watermarking key.

According to an embodiment of the present invention, in receive mode, the following steps are performed:

decoding of the data by using the authentication key to extract a message; and identity checking between the extracted message and said random number.

According to an embodiment of the present invention, the watermarking phase includes a phase of data watermarking by the sender by using the authentication key and any quantity as a message to be inserted.

According to an embodiment of the present invention, in receive mode, the receiver decodes the data by using the authentication key, the obtaining or not of a message after this decoding meaning an authentic transmission or not.

According to an embodiment of the present invention, the authentication phase includes the steps of:

transmission, from the sender to the receiver, at least of a random number and of an identifier of the sender;

calculation of the authentication key by the receiver based at least on the sender identifier and on a secret quantity of the receiver;

transmission, from the receiver to the sender, at least of an identifier of the receiver and of a quantity representing said random number, encrypted with the authentication key calculated by the receiver; and calculation of the authentication key by the sender based at least on the identifier of the receiver and a secret quantity of the sender.

According to an embodiment of the present invention, the step of authentication key calculation by the sender is followed by the steps of:

calculation of a second quantity representing said random number, encrypted with the authentication key calculated by the sender; and identity checking between the first and second encrypted quantities.

According to an embodiment of the present invention, the digital data are multimedia data.

The present invention also provides a multimedia digital data sender.

The present invention also provides a multimedia digital data receiver.

The present invention further provides a multimedia digital data transmission system.

The foregoing objects, features and advantages of the present invention, will be discussed in detail in the following non-limiting description of specific embodiments in connection with the accompanying drawings.

DETAILED DESCRIPTION

Figure 1:
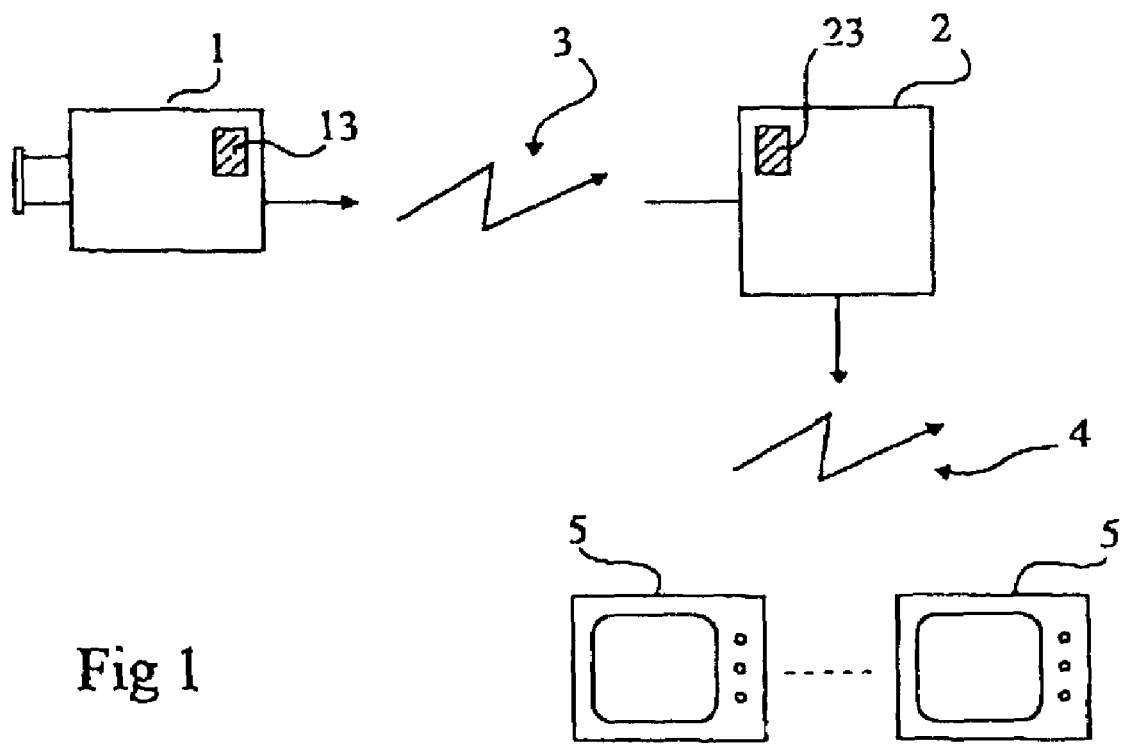
FIG. 1 very schematically shows a first example of application of the secure data transmission method according to the present invention.

For clarity, only those method steps and those elements of the circuit that are necessary to the understanding of the present invention have been shown in the drawings and will be described hereafter. In particular, the steps of actual watermarking of the digital data files have not been described in detail.

A feature of the present invention is to provide, before transmission of the data, a receiver authentication phase and, once said receiver has been authenticated, to watermark the data files by applying a watermarking algorithm using the preceding authentication key. Thus, according to the present invention, the key which is determined in the authentication is the same as that used to watermark the digital data (the image) by inserting a message or, more generally, to encrypt or code the digital data.

The present invention more specifically applies to a symmetrical authentication algorithm, that is, sharing a key with no transmission thereof. An example of a symmetrical algorithm which may be chosen to implement the present invention is described in document FR-A-2,716,058, which is incorporated herein by reference.

According to the present invention, the transmission method further involves a secret datum specific to the sender (for example, the image recording device). According to a preferred embodiment, this secret datum is a physical datum provided, for example, by a physical parameter network specific to the sender device. Such a physical parameter network is known and enables providing a binary code forming a secret key on the transmit side and which is permanently present in an integrated circuit without this being in a readable memory.

FIG. 1 shows a first example of application of a secure data transmission method according to the present invention. According to this example, a shooting camera 1 is the sender device. Camera 1 is then provided with a message insertion (watermarking) device 13 for the data according to the present invention. This device for example uses a physical parameter network to extract a secret key which will be used in the method described hereafter in relation with FIG. 3. Camera 1 communicates with a receiver 2 over any transmission system 3 (for example, the Internet). Receiver 2 includes on its side also a device 23 according to the present invention adapted to decoding the images from camera 3. Receiver 2 is, for example, a television broadcasting system and thus transmits back the images that it receives from camera 1, for example, by radio transmission means 4 or by cable, to distant television receivers 5.

As an alternative, the shooting camera is a conventional camera, and a specific computer terminal is used to transmit the data. It will for example be a microcomputer provided with a smart card reader enabling the user to be identified by means of a card introduced into the reader. The card then forms device 13 of the present invention. According to another alternative, the identifier is linked to the terminal which forms device 13 of the present invention.

Figure 2:
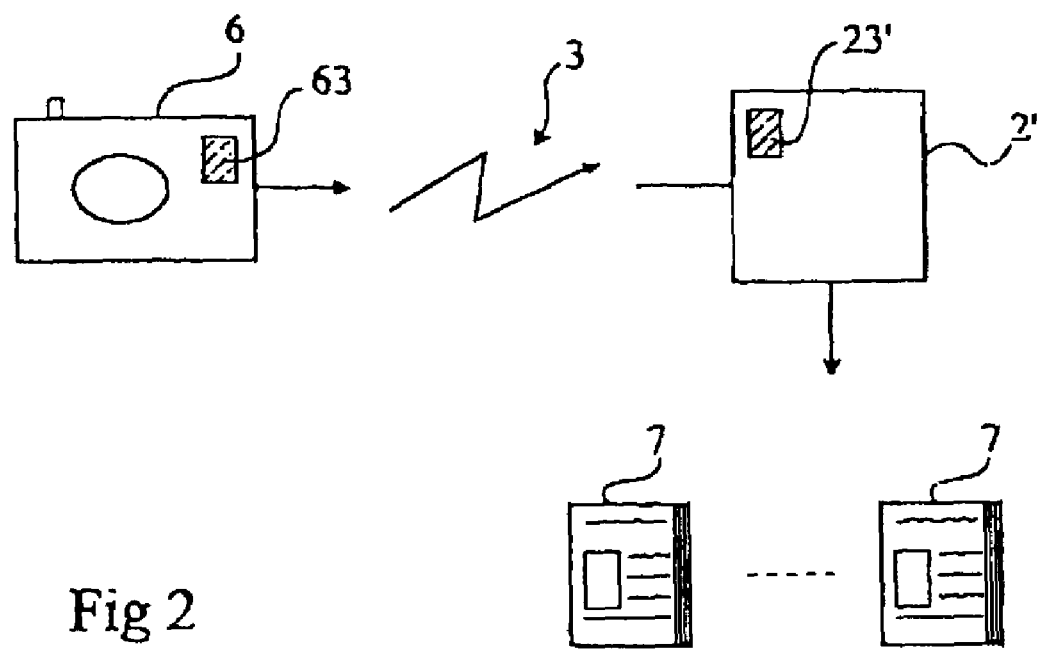
FIG. 2 very schematically shows a second example of application of the secure data transmission method according to the present invention.

FIG. 2 shows a second example of application of the present invention. In this example, the sender is a digital photographic camera 6 provided with a device 63 according to the present invention for watermarking images to be transmitted. These images are, as in the first example, transmitted by any conventional adapted network 3 to a receiver 2'. Receiver 2' here is, for example, the computer system of a press agency and is also provided with a device 23' enabling it to implement the method of the present invention and especially to decode the data, to extract the message inserted in the image upon transmission. The received photographs are then, for example, transmitted back to editors to be distributed in the form of printed publications 7.

As for the first example, an alternative according to which digital images taken by device 6 are transferred to a temporary physical storage means (for example, a flash memory, a floppy disk, or a CD-ROM) to be read by a transmission computer which then watermarks the data by means of a user authentication system (for example, a smart card or a software identification) may be provided.

It should however be noted that a watermarking of the data directly in the shooting camera is a preferred embodiment due to the additional security that this introduces, as compared to the alternatives using a separate terminal.

Although reference has been made hereabove to hardware decryption devices 23 and 23', these also may be software means programmed on the data reception computer systems.

Figure 3:
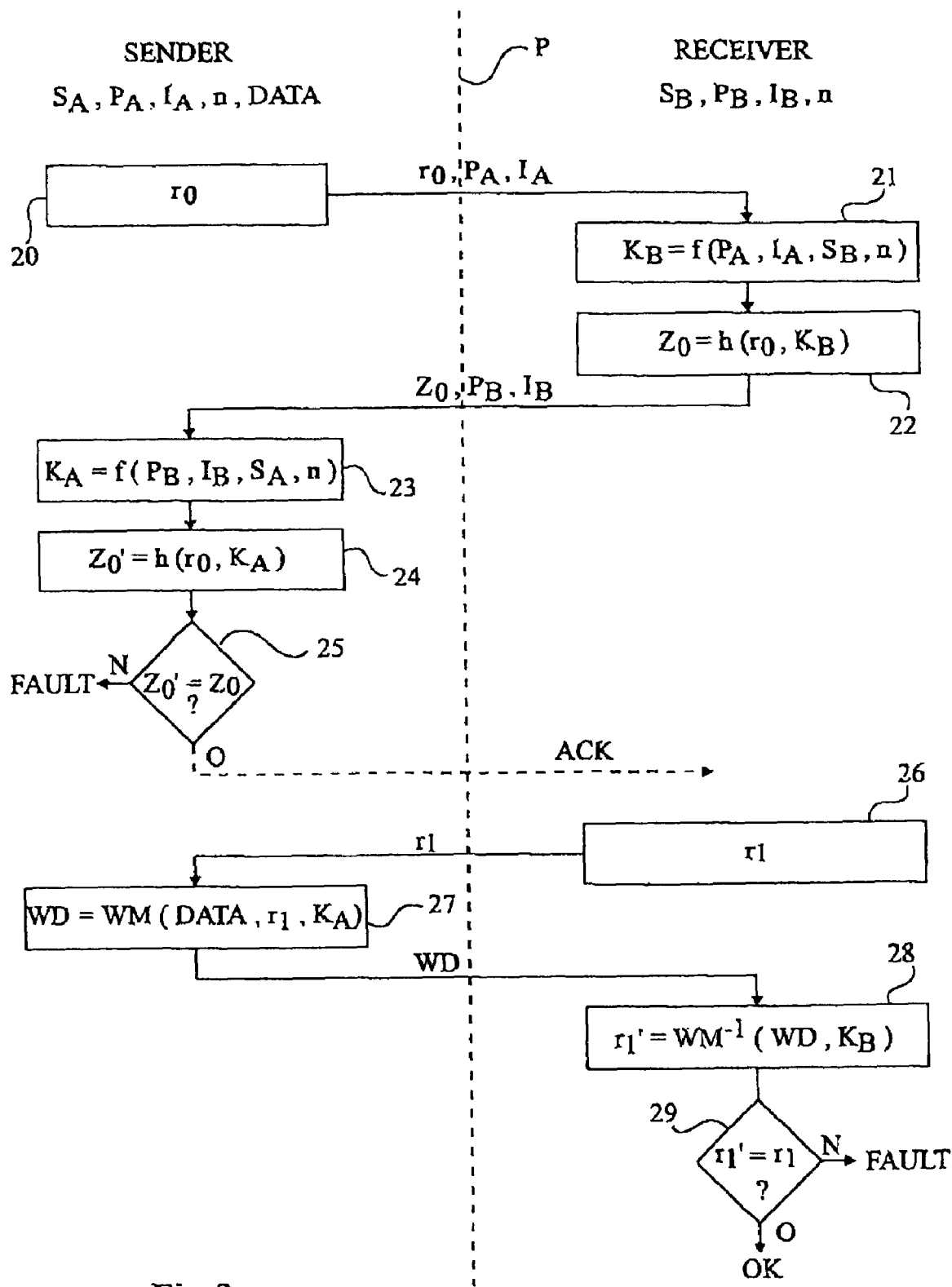
FIG. 3 illustrates in a simplified flowchart an embodiment of the secure data transmission method according to the present invention.

FIG. 3 illustrates, in a simplified flowchart, an embodiment of the secure transmission method according to the present invention. In FIG. 3, the steps implemented on the sender side have been shown to the left of dotted lines P and the steps implemented on the receiver side have been shown to the right of dotted lines P.

According to the embodiment illustrated in FIG. 3, a symmetrical authentication algorithm, that is, sharing a key with no transmission thereof, is implemented.

On the sender side, the known binary data (or the data contained in the sender) are a secret key SA, a certificate PA, an identifier of the sender IA, an integer n representing the modulo of the different operations implemented by the algorithm and, of course, the digital data forming the image (s) to be transmitted. The secret key of the sender may be stored in a non-volatile memory of this sender, be typed by a user, or come from a separate device, for example, a smart card, or further be contained in a physical parameter network associated with an integrated circuit of the sender. The certificate corresponds to a quantity provided by an external device generally called the "trusted third party". In a personalization phase, the sender calculates a public key that it transmits, with its identifier, to a "trusted third party". The latter calculates a certificate that it sends back to the sender which stores it. Afterwards, in use, the sender communicates to the receiver its identifier and the certificate. The receiver recalculates the public key of the sender based on these two values and a public key of the "trusted third party". An example of how the certificate is obtained is described in above-mentioned document FR-A-2,716,058.

The receiver contains as digital data a secret key SB, a certificate PB, an identifier IB, and integer n representing the modulo of the algorithm. The receiver certificate is obtained in a way analogous to that in which the sender certificate is obtained.

According to a first example of implementation, certificates PA and PB are digital data contained in respective memories of the sender and of the receiver.

According to another preferred example, a so-called private and public key symmetrical authentication algorithm is used. It will for example be an algorithm known as the RSA algorithm, such as that described in document U.S. Pat. No. 4,405,829 which is incorporated herein by reference.

In a first step (following the possible personalization of certificates PA and PB by means of a trusted third party), the sender draws a random number r0 (block 20) and transmits, to the receiver, number r0 as well as its certificate PA and its identifier IA.

The receiver then calculates (block 21) a key KB by implementing a function f corresponding to the authentication algorithm based on data PA, IA, SB, and n. Referring to the example of the RSA algorithm, the calculated function is:

$KB=(PAe+IA)SB \mod n$, where e represents a public key (provided by the trusted third party).

The receiver then calculates (block 22) a datum z0 by implementing a symmetrical encryption algorithm implementing a function h with, as operands, number r0 received from the sender and the key KB that it has just calculated.

According to a specific example of implementation, the encryption algorithm is a symmetrical algorithm known as the DES algorithm (Data Encryption Standard). An example of this algorithm is described in "Applied Cryptography" by B. Schneier, published by Wiley in 1996, pages 265 to 301 which is incorporated herein in its entirety.

Datum z0 is then transmitted, with certificate PB and identifier IB of the receiver, to the sender. The latter calculates (block 23), based on data PB, IB, SA and n, a key KA implementing function f of the authentication algorithm. Still referring to the example of an RSA algorithm, the applied relation is:

$KA=(PBe+IB)SA \mod n$.

If the authentication is positive, keys KA and KB are identical. It should however be noted that these keys never transit in the clear between the two elements.

The next step includes having the sender calculate (block 24) a datum z0' based on quantity r0 and key KA, by implementing encryption function h (for example, the DES algorithm indicated hereabove). Since keys KA and KB are identical, a same quantity z'0 as datum z0 which has been transmitted by the receiver must be obtained.

An identity test is executed (block 25, z'0=z0?) on the sender side. If the test provides a negative result, this means no authentication of the receiver and the transmission process stops (sets to FAULT). Conversely, if the result of the comparison is positive, the transmission method can carry on.

As an alternative, step 24 is replaced with the execution of the inverse encryption function h-1 on quantity z0 with key KA. The test of step 25 then includes checking the identity between quantity r0 and the result of step 24.

According to the embodiment discussed in relation with FIG. 3, the sender then sends to the receiver a signal ACK indicative of a valid authentication. The receiver then draws (block 26) a random quantity r1 that it transmits to the sender. Based on key KA that it has previously calculated, the sender inserts (block 27), as a message in the data of the image, quantity r1 by implementing a watermarking algorithm WM and obtains a watermarked data file WD.

According to an alternative embodiment, random datum r1 may be previously drawn by the receiver and be transmitted by it at the same time as data z0, PB and IB in the authentication phase. In this case, acknowledgement signal ACK of the sender needs not be transmitted to the receiver. The sender simply carries on the process with the watermarking phase in the case where the authentication of test 25 is positive.

File WD of data watermarked by datum r1 by using key KA is transmitted to the receiver. Said receiver then just has to decode the data.

For this purpose and according to the present invention, the receiver extracts, from the received image, the binary code or message which has been included, by applying (block 28) the read or extraction function WM-1 to image WD and by using key KB.

If the image does correspond to that sent by the sender, quantity r1' must be equal to random quantity r1 drawn at step 26 by the receiver. Said receiver then preferentially performs an identity test (block 29) on these quantities (r1'=r1?). If the result is negative, the receiver knows that the image risks having been falsified and takes the appropriates measures (FAULT). If the identity is respected, the conventional normal process of exploitation of the received data which is no object of the present invention is carried on (OK).

It should be noted, for the application of the present invention, what matters is for the receiver to know whether the image has been modified. Accordingly, it is not disturbing to transmit in clear (non-encrypted) random quantity r1 used to watermark the image file.

Another advantage of the present invention is that the link created between the authentication phase determining keys KA and KB and the file watermarking guarantees that the receiver finds out that the transmission has been violated. It can also be considered that the watermarking algorithm is used to convey the authentication from the sender to the receiver, thus avoiding an additional authentication phase.

According to the present invention, it is important for the transmission process to be initiated by the sender by the sending of random quantity r0. Indeed, it could have been devised to have the receiver cause the authentication and have the image watermarked by the sender immediately sent with the extracted key. This would enable the receiver, if it finds the symmetrical key, to check the matching of the drawn random number and to be sure of the origin of the photograph. However, this would offer no guarantee to the sender that it has sent the image to the expected receiver. Indeed, said sender may be uncertain of whether random quantity r0 and the data (certificate and identifier) that it receives do come from the expected receiver (a pirate may send the certificate and identifier that the sender expects to receive).

Another advantage of the present invention is that the image watermarking may be accompanied by an integrity test thereof to make any modification action on these data impossible. This alternative is however optional.

The embodiment described in relation with FIG. 3 concerns the use of a symmetrical watermarking algorithm. According to an alternative, applied to so-called advanced watermarking algorithms which enable avoiding the sending of a random number (r1) by the receiver, this random number is drawn by the sender or said sender uses any watermarking datum, provided to respect the use of key KA in the watermarking algorithm. On the receiver side, the received file is read by using key KB as a decoding key. If any watermarking (random or data chosen on the sender side), even unknown, is recovered this means an authentic transmission. If the used key KB is not the right one, the receiver is unable to recover any watermarking. This a property of so-called advanced algorithms such as that described, for example, in document WO-A-9945696 which is incorporated herein by reference.

Of course, the present invention is likely to have various alterations, modifications, and improvement which will readily occur to those skilled in the art. In particular, any symmetrical authentication algorithm may be used in the first phase of the method of the present invention provided that the shared but non-transmitted key, determined on each side (sender and receiver) can be subsequently used as a key by the image or data file watermarking algorithm.

Further, the present invention may be implemented by hardware or software means, its practical implementation being within the abilities of those skilled in the art based on the functional indications given hereabove.

Finally, although the present invention has been described in relation with an application to image transmission, it applies to any digital data transmission which is desired to be secured by means of an algorithm of watermarking by insertion or inclusion of a digital quantity (r1) with a key.

Further, the present invention enables, with symmetrical watermarking algorithms, obtaining the same security level as with symmetrical algorithms in which the read key is a public quantity and is different from the watermarking key, which is a secret quantity.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A secure method of digital data transmission between a sender and a receiver, including the following phases:
   receiver authentication by a symmetrical authentication key sharing algorithm with no transmission of the key;
   data watermarking by using the authentication key as the watermarking key; and
   transmission of the watermarked data,
   wherein the authentication phase includes the steps of:
   transmission, from the sender to the receiver, at least of a random number and of an identifier of the sender;
   calculation of the authentication key by the receiver based at least on the sender identifier and on a secret quantity of the receiver;
   transmission, from the receiver to the sender, at least of an identifier of the receiver and of a first quantity representing said random number, encrypted with the authentication key calculated by the receiver; and
   calculation of the authentication key by the sender based at least on the identifier of the receiver and on a secret quantity of the sender,
   wherein the step of authentication key calculation by the sender is followed by the steps of:
   calculation of a second quantity representing said random number, encrypted with the authentication key calculated by the sender; and
   identity checking between the first and second encrypted quantities.

2. The method of claim 1, wherein the watermarking phase includes inserting a message in the data.

3. The method of claim 2, wherein the watermarking phase includes the steps of:
   drawing, at the receiver, a random number and transmission of this number to the sender; and
   watermarking the data by the sender by using said random number as a message to be inserted and the authentication key as the watermarking key.

4. The method of claim 3, including, in receive mode, the steps of:
   decoding of the data by using the authentication key to extract a message; and
   identity checking between the extracted message and said random number.

5. The method of claim 2, wherein the watermarking phase includes the step of data watermarking by the sender by using the authentication key and any quantity as a message to be inserted.

6. The method of claim 5, wherein in receive mode, the receiver decodes the data by using the authentication key, the obtaining or not of a message after this decoding meaning an authentic transmission or not.

7. The method of claim 1, wherein the digital data are multimedia data.

* * * * *